(12) United States Patent
Donovan (10) Patent No.: US 11,510,390 B1
(45) Date of Patent: Nov. 29, 2022

(54) PLATFORM IN PARTICULAR FOR USE AS A PET BED

(71) Applicant: James Joseph Donovan, Woodstock, CT (US)

(72) Inventor: James Joseph Donovan, Woodstock, CT (US)

( * ) Notice: Subject to any disclaimer, the term of this patent is extended or adjusted under 35 U.S.C. 154(b) by 0 days.

(21) Appl. No.: 17/811,585

(22) Filed: Jul. 10, 2022

(51) Int. Cl.
*A01K 1/015* (2006.01)

(52) U.S. Cl.
CPC ................................. *A01K 1/0157* (2013.01)

(58) Field of Classification Search
CPC .... A01K 1/0157; A01K 1/015; A01K 1/0152; A01K 1/0353; A01G 9/033; A01G 20/00; A01G 20/20
See application file for complete search history.

(56) References Cited

U.S. PATENT DOCUMENTS

| | | | |
|---|---|---|---|
| 4,902,540 A | 2/1990 | Martino | |
| 5,119,763 A | 6/1992 | Crabtree | |
| 5,144,911 A | 9/1992 | Moore et al. | |
| 5,226,384 A | 7/1993 | Jordan | |
| 5,363,804 A | 11/1994 | McAlister | |
| 5,482,007 A * | 1/1996 | Kumlin | A01K 1/0107 119/169 |
| 5,588,393 A | 12/1996 | Heilborn | |
| 5,833,546 A | 11/1998 | Wang | |
| 6,156,396 A | 12/2000 | Florian | |
| 6,508,200 B1 | 1/2003 | Remis | |
| 6,578,520 B2 * | 6/2003 | Otsuji | A01K 1/0107 119/165 |
| 6,859,962 B2 | 3/2005 | Diak/Ghanem | |
| 7,185,604 B2 | 3/2007 | Holte | |
| 7,222,379 B2 | 5/2007 | DiGirolamo | |
| 7,363,667 B2 | 4/2008 | Borror et al. | |
| 7,559,290 B2 | 7/2009 | West | |
| 7,614,362 B2 | 11/2009 | Dunn et al. | |
| D664,303 S | 7/2012 | Chauncey et al. | |
| 8,342,126 B2 | 1/2013 | Simon et al. | |
| 8,671,887 B2 * | 3/2014 | Baker | A01K 1/0353 119/28.5 |

(Continued)

FOREIGN PATENT DOCUMENTS

| | | |
|---|---|---|
| BR | 1005643-2 A2 | 1/2013 |
| CA | 2752709 A1 | 3/2013 |

(Continued)

*Primary Examiner* — Kristen C Hayes
(74) *Attorney, Agent, or Firm* — Brian Roffe (57) ABSTRACT

Platform for particular use as a pet bed includes a foam core having an upper surface, a lower surface on an opposite side of the foam core from the upper surfaces, and at least one side surface between the upper and lower surfaces along a periphery of the foam core. Artificial turf extends over the upper surface and alongside each side surface. Elongate connectors extend through the foam core between the upper and lower surfaces and have opposite end regions projecting out of opposite sides of the foam core. These connectors may be rods or dowels with threaded end regions that pass through apertures in flaps of the artificial turf. Fasteners are screwed onto the threaded end regions of the dowels with the artificial turf inward of the fasteners to thereby cause the artificial turf to be urged toward and secured to the foam core.

23 Claims, 7 Drawing Sheets

(56) References Cited

U.S. PATENT DOCUMENTS

| | | | |
|---|---|---|---|
| 9,060,494 B2 | 6/2015 | Simon et al. | |
| 9,345,228 B2 * | 5/2016 | Lowery et al. | |
| 9,750,224 B2 * | 9/2017 | Kupka | A01K 1/035 |
| 9,913,551 B1 | 3/2018 | Baker | |
| 10,327,417 B2 | 6/2019 | Gaskill et al. | |
| 10,881,080 B2 | 1/2021 | Komatsubara | |
| 10,893,657 B2 | 1/2021 | Cipriano | |
| D915,693 S * | 4/2021 | White | A47L 13/12 |
| | | | D30/161 |
| 11,234,411 B2 | 2/2022 | Becker | |
| 2004/0237899 A1 | 12/2004 | Fung | |
| 2006/0021583 A1 * | 2/2006 | Jakubowski | A01K 1/0353 |
| | | | 119/28.5 |
| 2009/0004409 A1 | 1/2009 | McCoy | |
| 2011/0100301 A1 * | 5/2011 | Trussardi | A01K 1/0152 |
| | | | 119/169 |
| 2014/0158060 A1 * | 6/2014 | Martin | A01K 1/0107 |
| | | | 119/169 |
| 2017/0280679 A1 | 10/2017 | Swedyk | |
| 2018/0020840 A1 | 1/2018 | Auclair | |
| 2019/0313600 A1 | 10/2019 | Komatsubara | |
| 2019/0313601 A1 | 10/2019 | Angevine | |
| 2019/0364843 A1 | 12/2019 | Murphy | |

FOREIGN PATENT DOCUMENTS

| | | |
|---|---|---|
| CN | 207720918 U | 8/2018 |
| JP | 0767489 A | 3/1995 |

* cited by examiner

PLATFORM IN PARTICULAR FOR USE AS A PET BED

FIELD OF THE INVENTION

The present invention relates generally to a platform for use as a pet bed and more particularly to a pet bed that has an improved securing mechanism for securing artificial turf to an underlying substrate such as a foam core.

BACKGROUND OF THE INVENTION

Pets are an important part of the family. Pet owners desire to provide the most comfortable pet cushions and beds as possible. A substantial number of pet beds on the market today are made with a core of solid material such as common polyurethane foam. Common polyurethane foams (high resilience foams) are resilient, resisting pressures and pushing against the source of impression. Logically, the foam's recovery pressure is greatest at point where the pet is causing the greatest impression.

Even more so, there are numerous patent publications directed to pet beds, some of which focus on providing comfort to the pets and others of which seek to provide a cleanable surface on which the pet lies. In spite of the pet beds described in the following prior art, there is room for improvement for a pet bed that is durable and secures a surface on which the pet lies to an underlying support substrate.

U.S. Pat. No. 5,119,763 (Crabtree) describes an orthopedically designed, washable animal bed that has a quilting pattern which is said to provide orthopedic support for a sleeping or resting animal. The bed is filled with sanitary material and has a recess so that the sleeping animal is able to satisfy its inborn instinct to withdraw into a recess while sleeping.

U.S. Pat. No. 5,144,911 (Moore et al.) describes a bed for a pet including a mattress pad, an inner liner around the mattress pad, a cover that fits on the inner liner when on the mattress pad and a mat placed upon the cover. In use, a pet, such as a cat or dog, is said to be able to recline and sleep comfortably on the bed.

U.S. Pat. No. 5,226,384 (Jordan) describes an animal bed formed of a resilient core having generally a slab shape and a cover surrounding and encasing the core, and which is formed of an aramid fabric sheet. The core of the bed is resilient polymeric foam, rubber, fiber fill, wood shavings or wood chips, of which the foam or rubber is preferred.

U.S. Pat. No. 5,363,804 (McAlister) describes a pet cushion including a pad of layers of raw unwoven polyester. Each layer has a solid first fiber and a second fiber that has a core and a sheath surrounding the core. The sheath has a lower melting temperature than the core. For manufacture, the pad is heated to cause the sheath of the second fiber to melt and stick to the adjacent fiber, whether a first or a second fiber, and then cooled until the second fiber solidifies, attached to the adjacent fiber. The resulting material is a matted web of layered fibers that is subsequently cut into a pad of suitable size, such as large enough to accommodate a sleeping cat. The edge of the pad is bound by sewing or heat treatment.

U.S. Pat. No. 5,588,393 (Heilborn) describes a collapsible pet bed having foam cores which form the bottom cushion and the surrounding wall and that are enclosed in fabric enclosures. The enclosure for the bottom cushion is joined to the fabric layer which extends over the inside and top of the wall core, but is free from attachment to the fabric which extends under the lower edge of the wall. Lower edges of the fabric enclosures are provided with elasticized openings which retain the foam cores, but permit their removal for washing of the fabric cover.

U.S. Pat. No. 7,185,604 (Holte), also published as U.S. Patent Application Publication No. 2005/0240000, describes an orthopedic cushion for pets including a padding layer of slow recovery visco-elastic foam that is said to provide orthopedic advantages of reducing pressure points and facilitating blood flow, a supporting padding layer of material which supports the slow recovery visco-elastic foam while providing additional loft and cushioning, a protective liner of a flexible waterproof yet breathable material protecting the padding from liquids of all nature, and a washable fabric cover.

U.S. Pat. No. 7,222,379 (DiGirolamo) describes a pillow kit cover member, which includes substantially identical top and bottom portions, each of which includes inner and outer layers. The top and bottom portions are secured around the peripheries thereof, except for one side, which includes a zipper or similar element for opening and closing the pillow. The pillow includes an interior chamber assembly having baffle members which extend between the inner layers of the top and bottom portions, defining individual chambers which extend the length of the pillow. Filling is provided within the pillow chamber, as well as a plurality of inserts, having various fillings, which are selectively insertable into and removable from the pillow chambers. The inserts are not however attached to the inner and outer layers.

U.S. Pat. No. 7,363,667 (Borror) describes a multi-purpose textured pad for providing comfort to a user, which may be a pet. The pad includes a first flexible planar member, a second flexible planar member coupled to the first planar member along its edges, a first compressible padding material between the bottom the first flexible planar member and a top of the second flexible planar member, and a second compressible padding material in an aperture bounded in the first compressible padding material, and configured to generate an audible sound when compressed.

U.S. Pat. No. 7,559,290 (West) describes a pet bed system having an overlay removably secured to a pet bed. The pet bed has a top surface for supporting a recumbent pet within a supportive area, a basal area, and a transition area between the supportive area and the basal area. The overlay has a protective area on the supportive area of the top surface, and extension areas extending from the protective area and overlapping the transition area of the pet bed while exposing portions of the top surface. The pet bed and the extension areas may be provided with a variety of different mating attachment members to removably secure the overlay to the pet bed.

U.S. Pat. No. 7,614,362 (Dunn et al.) describes a pet bed assembly including a water resistant outer cover defining an enclosed space and a removable blanket that is removably attached to the exterior of the outer cover. The removable blanket is removable from the outer cover for washing and replacement and is reversible, with an attachment mechanism that secures it to the outer cover with either surface facing the pet. An inner bed assembly is positioned within the enclosed space and includes a perimeter bolster portion and an interior cushion portion.

U.S. Pat. No. 8,342,126 (Simon et al.) describes a pet bed including an outer cover having an inner volume, and at least one stuff sack that is porous, for placement within the inner volume of the outer cover. While the inner stuff sack may be filled with a wide variety of stuffing items, the stuff sack is filled with owner-supplied items, and may include a scent that is desirable or comforting to the intended animal, e.g., the scent of a known person or animal.

U.S. Pat. No. 8,671,887 (Baker et al.) describes a bed or similar support structure in which two sheets define an interior volume that is subdivided into cells. Adjacent cells are in fluid communication with one another. Subdivision of the interior volume into cells may be achieved by coupling the upper sheet and the lower sheet at several predetermined points.

U.S. Pat. No. 9,345,228 (Lowery et al.) describes a pet bed and a method for making it wherein the pet bed includes a rigid base, a support member removably attached to the rigid base, and a cushion removably attached to the rigid base over the support member.

U.S. Pat. No. 10,327,417 (Gaskill et al.) describes a static electricity discharging pet bed having a foam-like cushion pad, an inner cover fabricated of waterproof, anti-bacterial, anti-fungal, and anti-urine material. An outer cover encompasses the inner cover and is fabricated of an electrically conductive material that conducts static electricity from the pet bed through an electrically conductive conductor, to an electrically conductive ground wire, and then to a ground only plug connected to a grounded electrical outlet. When a pet is positioned on the pet bed, static electricity affecting the animal is drained to electrical ground.

U.S. Patent Application Publication No. 2004/0237899 (Fung) describes a chew-resistant pet bed including a mattress with insert sections, rims, and spherical joints, all of which are integrally molded from a chew-resistant homogeneous resilient non-toxic bitter material. Alternatively, the components of the pet bed are detachably coupled to one another.

U.S. Patent Application Publication No. 2009/0004409 (McCoy) describes artificial pet grass for use by pet owners and pet caregivers to provide a pet with an area of artificial grass. The artificial pet grass includes a pad member having a predetermined shape and thickness and is made from a material and tufts, strands and/or patches of artificial grass protruding upwards from and attached to an upper surface of the pad member.

U.S. Patent Application Publication No. 2017/0280679 (Swedyk) describes a pet bed having an outer shell that wicks moisture away from a wet animal. The outer shell may have hydrophobic properties that permit a horizontal flow of moisture across a surface thereof and the horizontal flow of moisture lessens a concentration of a vertical flow of moisture. The pet bed may include a first padding layer, a second padding layer, and four or more absorbing layers positioned between the first padding layer and the second padding layer.

U.S. Patent Application Publication No. 2018/0020840 (Auclair) describes a portable bed for outdoor use by a pet which is movement-resistant when placed on a ferromagnetic surface such as a truck bed. The portable bed includes a durable removable outer cover suitable for exposure to inclement weather and an inner cushioning element within the outer cover. At least a portion of the outer cover is made of a material producing a sufficiently strong magnetic field to impede or prevent the bed from shifting or otherwise moving on the ferromagnetic surface.

U.S. Patent Application Publication No. 2019/0313600 (Komatsubara) describes a pet bed which is not soiled by liquids such as liquid excrement and cleaning solutions, and which allegedly maintains excellent sanitary conditions. This pet bed has a bed main body that includes a frame and a mat which is less thick than the frame and is detachable from the frame. The pet bed also has an absorbent sheet on the top surface of the mat, and, in an opened state, the area in plan view of the absorbent sheet is greater than the area in plan view of the top surface of the mat.

U.S. Patent Application Publication No. 2019/0313601 (Angevine) describes a pet bed having a first layer that retains a filler material, a second layer surrounding the first inner layer and a third layer surrounding the second layer. The second inner layer has a waterproof shell so that liquid cannot contact the first inner layer if the second outer layer is exposed to a liquid. The third layer forms a second shell and is formed from a breathable fabric. The third layer can absorb liquid that may come into contact with the third layer. The second and third layers are selectively securable and removable from the first layer.

U.S. Patent Application Publication No. 2019/0364843 (Murphy) describes a pet bed cover having a medical-grade water resistant or water-proof material that is sized and fits over a pet bed to provide a cover for the pet bed.

Canadian Patent Publication No. 2752709 (Hennessey) describes a pet bed which is a waterproof, vinyl, cushioned pillow, covered with a removable, washable, pre-shrunk, fabric, sleeve/sham envelope covering used as a resting/sleeping place for pets.

Chinese Patent Publication No. 207720918 (Gao) describes a pet bed including a drain pan, waterproof wear-resistant structure, and a dustcoat made of cloth. The dustcoat connection is on the drain pan.

OBJECTS AND SUMMARY OF THE INVENTION

It is an object of at least one embodiment of the present invention to provide a new and improved platform for particular use as a pet bed.

It is another object of at least one embodiment of the present invention to provide a platform for particular use as a pet bed that has an upper surface defined by artificial turf.

It is another object of at least one embodiment of the present invention to provide a platform for particular use as a pet bed that provides firm support for a pet using the pet bed enabling the pet to be comfortable for extended periods of time.

It is another object of at least one embodiment of the present invention to provide a platform for particular use as a pet bed that is lightweight, portable, and space-efficient.

It is another object of at least one embodiment of the present invention to provide a platform for particular use as a pet bed that has an integral or integrated handle that enables easy and secure handling of the pet bed.

It is another object of at least one embodiment of the present invention to provide a platform for particular use as a pet bed including artificial turf as the upper surface and that has a securing mechanism to secure the artificial turf to an underlying substrate such as a foam core.

It is still another object of at least one embodiment of the present invention to provide a pet bed that is water-impermeable in its entirety, i.e., no part of the bed absorbs or retains water.

In order to achieve one or more of these objects, and possibly others, a platform for particular use as a pet bed in accordance with the invention includes a foam core having an upper surface, a lower surface on an opposite side of the foam core from the upper surface, and at least one side surface between the upper and lower surfaces along a periphery of the foam core. Artificial turf extends over the upper surface and alongside each side surface. Elongate connectors extend longitudinally through the foam core between the upper and lower surfaces and have opposite end regions at longitudinally opposite ends of the connector that project out of the foam core and beyond the side surface(s) on opposite sides of the foam core.

These connectors secure the artificial turf to the foam core. For example, if the connectors are dowels with threaded end regions, the threaded end regions are passed through apertures in flaps of the artificial turf and fasteners are screwed onto the threaded end regions with the artificial turf inward of the fasteners to thereby cause the artificial turf to be urged toward and possibly in contact with the foam core.

Typically, connectors are provided in sets running in the same direction through the foam core, and often perpendicular to each other or cross over one another at a location in an interior of the foam core. Thus, if the foam core is rectangular, there may be one or more connectors having opposite end regions projecting out of one pair of opposed sides or side surfaces and one or more other connectors having opposite end regions projecting out of a different pair of opposed sides or side surfaces.

To improve the stability of the pet bed and the securing of the connectors to the foam core, a retainer bar is preferably arranged each alongside each side surface. The end regions of the connectors pass through the apertures in the artificial turf and the at least one retainer bar to sandwich the artificial turf between one of the retainer bars and the foam core.

Fasteners engage with the end regions of the connectors to fasten the retainer bars against the foam core with the artificial turf therebetween.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
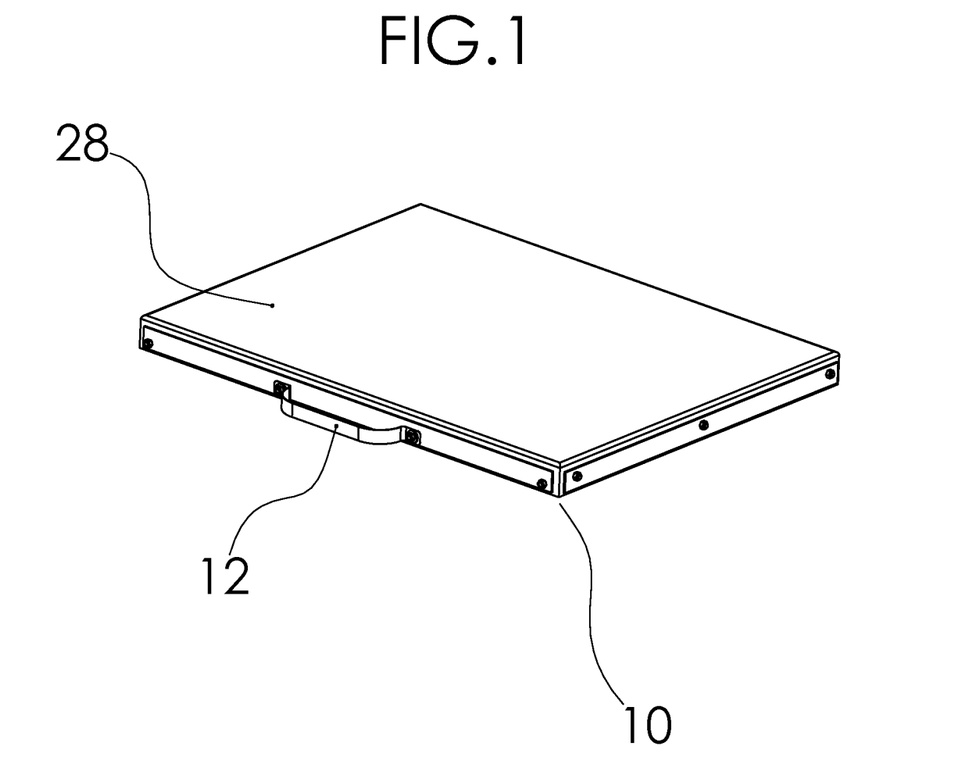
FIG. 1 is a top perspective view of a pet bed in accordance with the invention.

Referring to the accompanying drawings wherein the same reference numbers refer to the same or similar elements, FIG. 1 shows a pet bed 10 in accordance with the invention which has a generally rectangular shape and a handle 12. The shape of the pet bed 10 can vary from the rectangular shape as shown and may be circular or other polygonal shapes. The handle 12 is integrated into the pet bed 10 to enable easy handling of the pet bed 10 for placement of the pet bed at a desired location at which the pet is to sleep or rest, and relocation when it is desired to move the pet bed 10 to another, different location. Handle 12 is optional and although a preferred feature of the invention, it is not essential and embodiments of the pet bed 10 in accordance with the invention do not include a handle.

Figure 2:
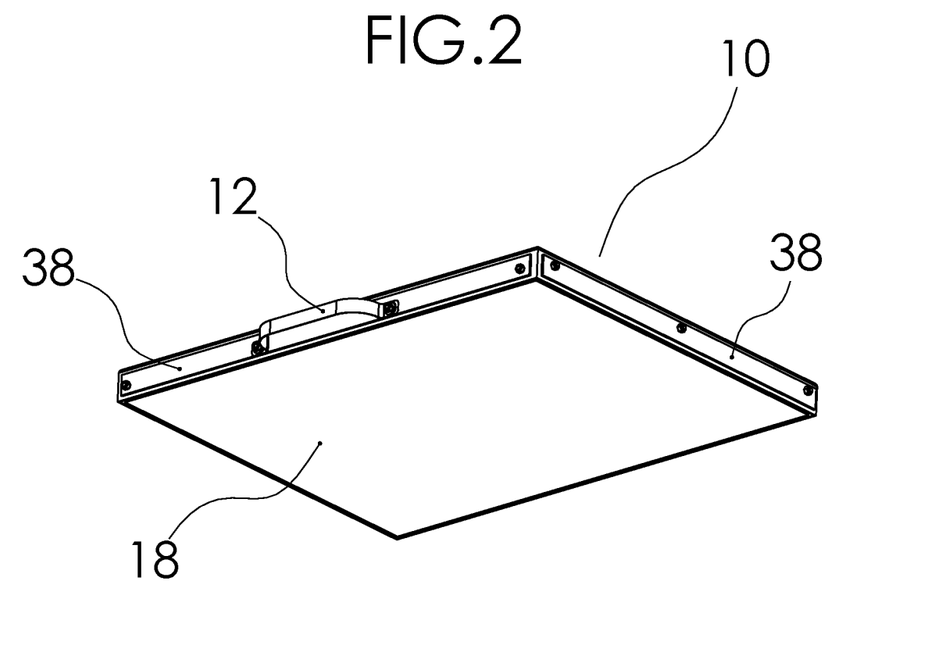
FIG. 2 is a bottom perspective view of the pet bed shown in FIG. 1.
Figure 5:
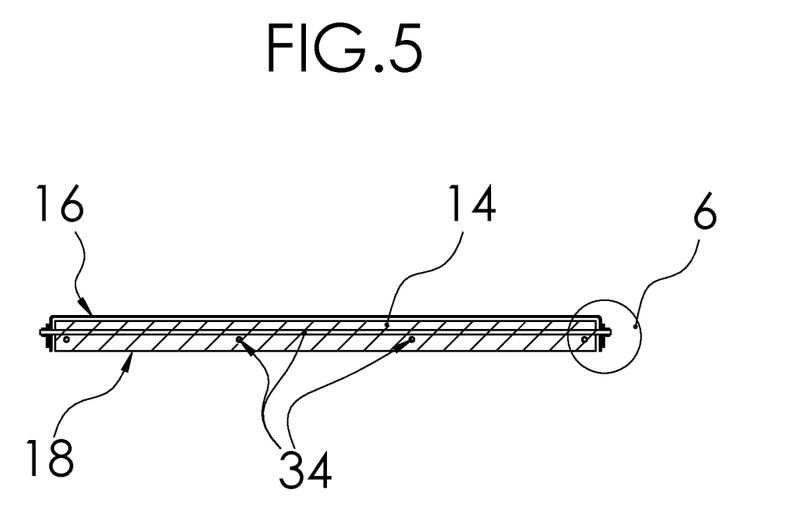
FIG. 5 is a cross-sectional view of the pet bed shown in FIG. 1 taken along the line 5-5 in FIG. 4.

Referring to FIG. 2 and the cross-sectional view in FIG. 5, the pet bed 10 includes a foam core 14 having an upper, preferably planar surface 16 and a lower, preferably planar surface 18 on an opposite side of the foam core 14 from the upper surface 18. The upper surface 16 is preferably planar since it forms the base upon which the pet will rest (see FIG. 5).

Nevertheless, if it is desired to provide the pet with some sort of contoured resting surface, this is achievable by contouring the upper surface 16 of the foam core 14. The lower surface 18 of the foam core 14 is preferably planar because it may be the lowermost exposed surface of the pet bed 10 and it would be beneficial for the pet bed 10 to rest on a planar underlying horizontal surface (see FIGS. 3 and 5).

Foam core 14 also include a peripheral surface that is partitioned into side surfaces 20, 22, 24, 26, one on each side of the rectangular foam core 14. As such, side surfaces 20, 24 are a first set of opposed or opposite side surfaces and side surfaces 22, 26 are a second set of opposed or opposite side surfaces.

The side surfaces 20, 22, 24, 26 extend between the upper and lower surfaces 16, 18, meaning for example, that each side surface 20, 22, 24, 26 has an upper edge meeting the upper surface 16 and a lower edge meeting the lower surface 18. Side surfaces 20, 22, 24, 26 are preferably planar. It must be appreciated that the number of side surfaces depends on the shape of the foam core 14 when viewed for the top or bottom. A hexagonal foam core will have six side surfaces, while a circular or oval foam core with have only a single side surface.

Foam core 14 is preferably made of polyethylene or a similar material, and may alternatively be considered a foam block. Selection of the material from which to fabricate the foam core 14 may be based on one or more of the following objectives. One objective of the pet bed 10 is to provide a buoyant pet bed which will enable the pet bed to float or remain above pooling water. Another objective is to provide an orthopedic pet bed that provides firm support for a pet using the pet bed with adequate cushioning for the pet to remain comfortable for extended periods of time. Another objective is to provide a lightweight, portable, and space-efficient pet bed. Yet another objective is to provide a pet bed that is cool in the summer and other warm or hot environmental conditions, which is possible because it provides air circulation under the pet. Yet another objective is to provide a pet bed that is water-impermeable in its entirety, i.e., no part of the bed absorbs or retains water. All of these objectives are rarely achieved if at all, by means of any of the pet beds described in the prior art mentioned herein.

By contrast, at least one and possibly all of these objective are achieved by the use of the polyethylene foam core, in combination with the remaining features of the pet bed 10 disclosed herein. Nevertheless, the invention is not restricted to the use of a foam core 14 as the underlying substrate and it is contemplated that other comparable materials or functionally or structurally equivalent materials might be used (the foam core 14 though being the preferred embodiment, and a foam core made partly or entirely of polyethylene being the most preferred embodiment).

A layer of artificial turf 28 extends over the upper surface 16 and alongside the side surfaces 20, 22, 24, 26. The artificial turf 28 drapes down over the side surfaces 20, 22, 24, 26, and is shaped or cut to avoid excess material at the corners of the foam core 14. The artificial turf 28 does not cover the lower surface 18 of the foam core 14 (see FIG. 5).

The composition and structure of the artificial turf 28 may be any of those known to those skilled in the art to which this invention pertains, and may be any of the materials disclosed in the patent publications mentioned above. The benefits of artificial turf are numerous and include but are not limited to the fact that it is extremely durable, and largely impervious to weather and repeated contact use as demonstrated in artificial turf fields commonly used for sports venues. Also, artificial turf 28 is resistant to water, odor, mildew, insects and pests. It can be easily cleaned with a hose, a vacuum cleaner or blower, or leaf blower.

An important aspect of the invention lies in the manner in which the artificial turf 28 is secured to the foam core 14. Specifically, it is the flap portions or flaps 30 of the artificial turf 28 that lie adjacent the side surfaces 20, 22, 24, 26 that are secured to the foam core 14 thereby securing the artificial turf 28 in its entirety to the foam core 14 (see FIG. 6). Although the West patent mentioned above provides for a variety of different attachment mechanisms to attach an overlay to side surfaces of a pet bed, these attachment mechanism differ from those of the invention which provide a considerably more durable attachment of the artificial turf 28 to the foam core 14.

Figure 6:
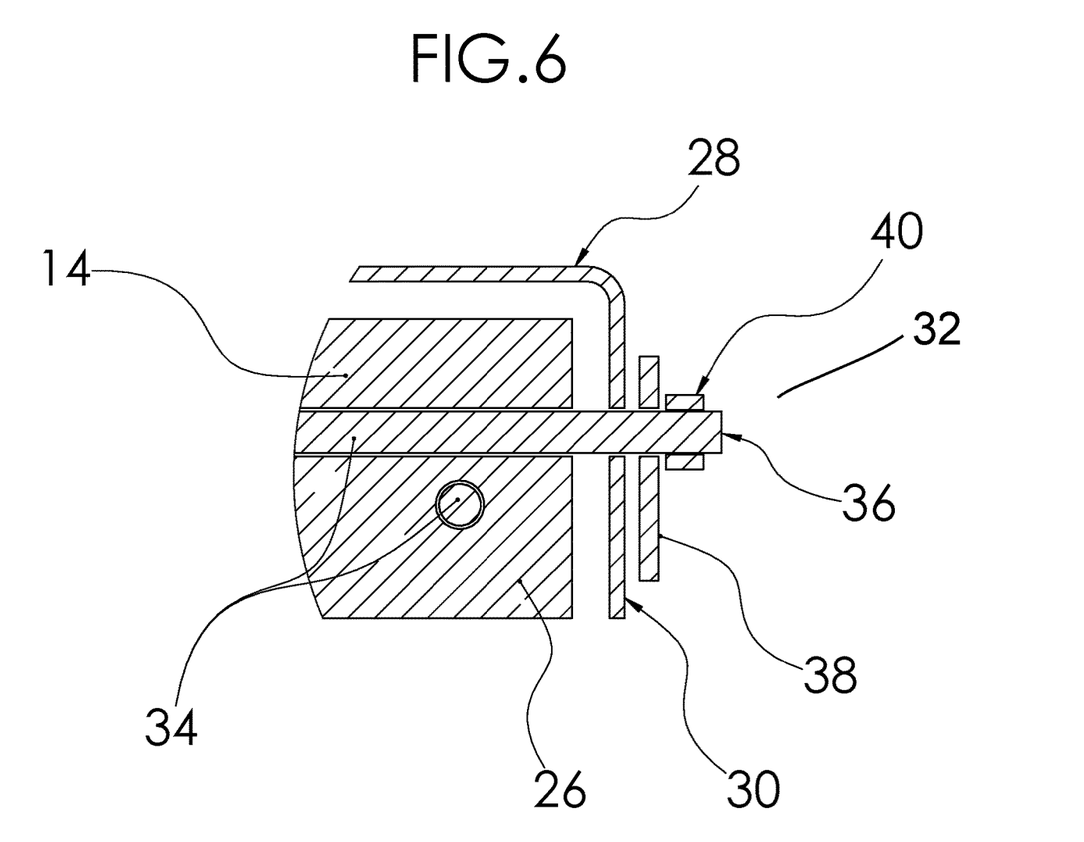
FIG. 6 is an enlarged view of the section 6 in FIG. 5.

A preferred securing mechanism 32 that secures the flaps 30 of the artificial turf 28 to the side surfaces 20, 22, 24, 26 includes elongate dowels 34 having threaded opposite end regions 36, retainer bars 38 alongside each of the side surfaces 20, 22, 24, 26 of the foam core 14, and fastener nuts 40 that engage with the threaded end regions 36 of the dowels 34 once the dowels 34 are positioned such that the threaded end regions 36 thereof project out of the opposed side surfaces 20, 22, 24, 26 of the foam core 14 and through apertures in the artificial turf 28 and aligning apertures in the retainer bars 38 (see FIG. 6). Dowels 34 are preferably semi-rigid, i.e., stiff and solid, but not inflexible. Numerous metals can provide these designed characteristics for the dowels 34.

It is not required that the entire side surfaces 20, 22, 24, 26 are overlaid by the flaps 30 of the artificial turf 28. This is only a preferred embodiment. At a minimum, there should be flap portions of the artificial turf 28 wherever the dowels 34 or other connectors project from the side surfaces 20, 22, 24, 26 of the foam core 14.

Figure 3:
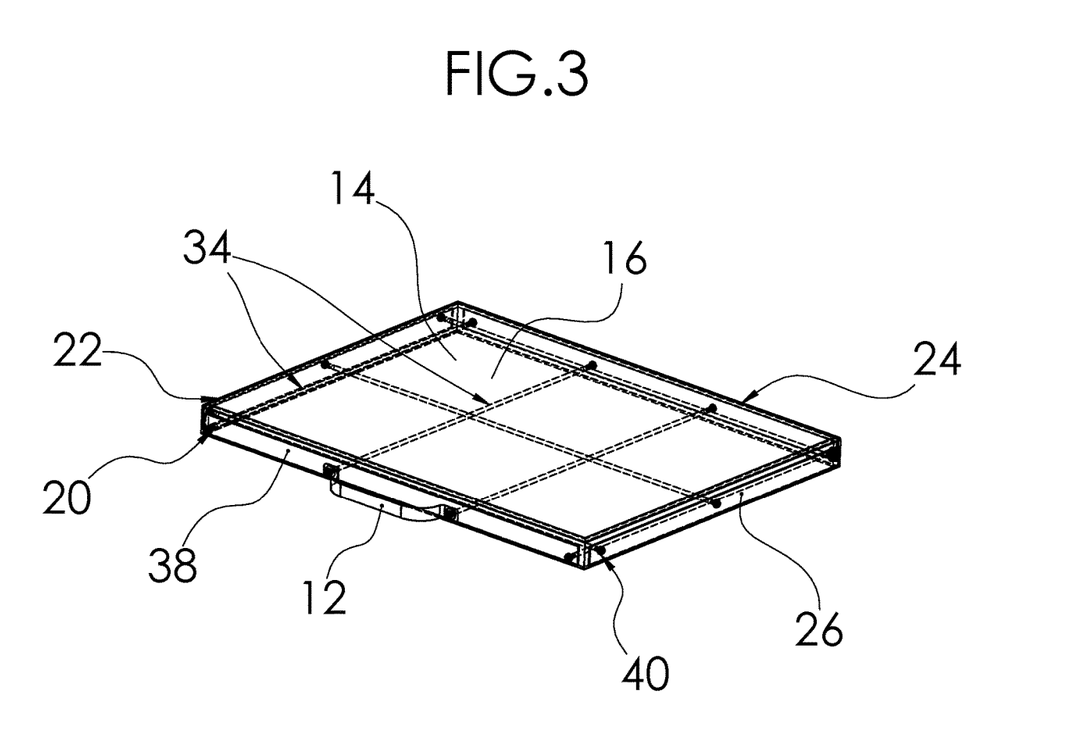
FIG. 3 is a top perspective view of the pet bed shown in FIG. 1 with the artificial turf removed to show interior details.

For a rectangular foam core 14 as shown, there is a first set of dowels 34 that extend between the long side surfaces 20, 24 of the rectangular foam core 14 (see FIG. 3). This set has four dowels 34, one of which is proximate the side surface 22, another which is proximate the side surface 26 and two other dowels 34 that are preferably spaced equally apart from each other and the dowels 34 alongside the side surfaces 22, 26. Preferably then, the dowels 34 between the long side surfaces 20, 24 should be spaced apart so that there is the same distance between adjacent pairs of dowels 34 that extend between the long side surfaces 20, 24. There of course may be more or less than four as in the illustrated embodiment depending on the length of the side surfaces 20, 24.

There is also a second set of dowels 34 that extend between the short side surfaces 22, 26 of the rectangular foam core 14. This set has three dowels 34, one of which is proximate the side surface 20, another which is proximate the side surface 24 and one other dowel 34 that is preferably situated midway between the dowels 34 alongside the side surfaces 20, 24. Preferably then, the dowels 34 between the short side surfaces 22, 26 should be spaced apart so that there is the same distance between adjacent pairs of dowels 34 that extend between the short side surfaces 22, 26. There of course may be more or less than three as in the illustrated embodiment depending on the length of the side surfaces 22, 26.

The dowels 34 of the first set extending between the long side surfaces 20, 24 are preferably perpendicular to the dowels 34 of the second set extending between the short side surfaces 22, 26 (see FIG. 3). Therefore, there are dowels 34 that cross over one another at locations in an interior of the foam core 14. Indeed, in the illustrated embodiment, each dowel 34 of the first set crosses over each dowel 34 of the second set and is perpendicular thereto. This positioning is however not critical to the invention.

The dowels 34 transect or extend through the foam core 14 between the upper and lower surfaces 16, 18 (see FIG. 5). There may be channels pre-formed through the foam core 14 for the dowels 34 to be inserted therethrough or the dowels 34 may be forced through the foam core 14 forming channels or the foam core 14 could be formed integral with the dowels 34. A portion of the foam core 14 is therefore above the dowels 34 and another position is below the dowels 34. The dowels 34 may transect the foam core 14 through an approximate middle of the foam core 14, in the vertical direction between the upper and lower surfaces 16, 18.

At least a portion and possibly all of the threaded end regions 36 project out of opposite sides of the foam core 14 to enable engagement with fastener nuts 40. This engagement is preferably the screwing of the fastener nuts 40 which have internal threads, to the end regions 36 of the dowels 34 which have external threads configured to cooperate with the internal threads of the fastener nuts or vice versa. The length of the threading at each end region 36 of the dowel 34 may be selected to enable sufficient length for the dowel 34 to pass through a respective aperture in the artificial turf 28 (and aligning aperture in the retainer bar 38) and pass into and through the fastener nut 40 without excess exposed length beyond the fastener nut 40 (see FIG. 6). It is not desired that the threaded end region 36 of each of the dowels 34 is exposed beyond the fastener nuts 40 because this will provide an exposed element that can cause injury to the pet or per bed handler.

Fastener nuts 40 may be any commercially available fastener configured to cooperate with threadings provided on the end regions 36 of the dowels 34. One possible fastener nut is a Nylon Insert Hex Lock Nut, which has been found to provide superior tightness-retention characteristics.

Use of dowels 34 with their threaded end regions and fastener nuts 40 with cooperating threading is one example of the manner in which connectors may be used to secure the artificial turf 28 to the foam core 14. More generally, the securing mechanism 32 includes connectors having opposite end regions that engage with the artificial turf 28, this engagement possibly but not required to be passage through apertures in the artificial turf 28. The end regions are then secured on the side of the artificial turf 28 opposite the side on which the foam core 14 is located to secure the artificial turf 28 to the foam core 14. Such connectors might be elongate and rigid rods, and the dowels 34 can be considered rods. Such rods engage with fasteners at each of their ends, whether like fastener nuts 40 or other comparable structure. Once engaged with the rods, the fasteners secure the artificial turf 28 against the foam core 14.

Figure 4:
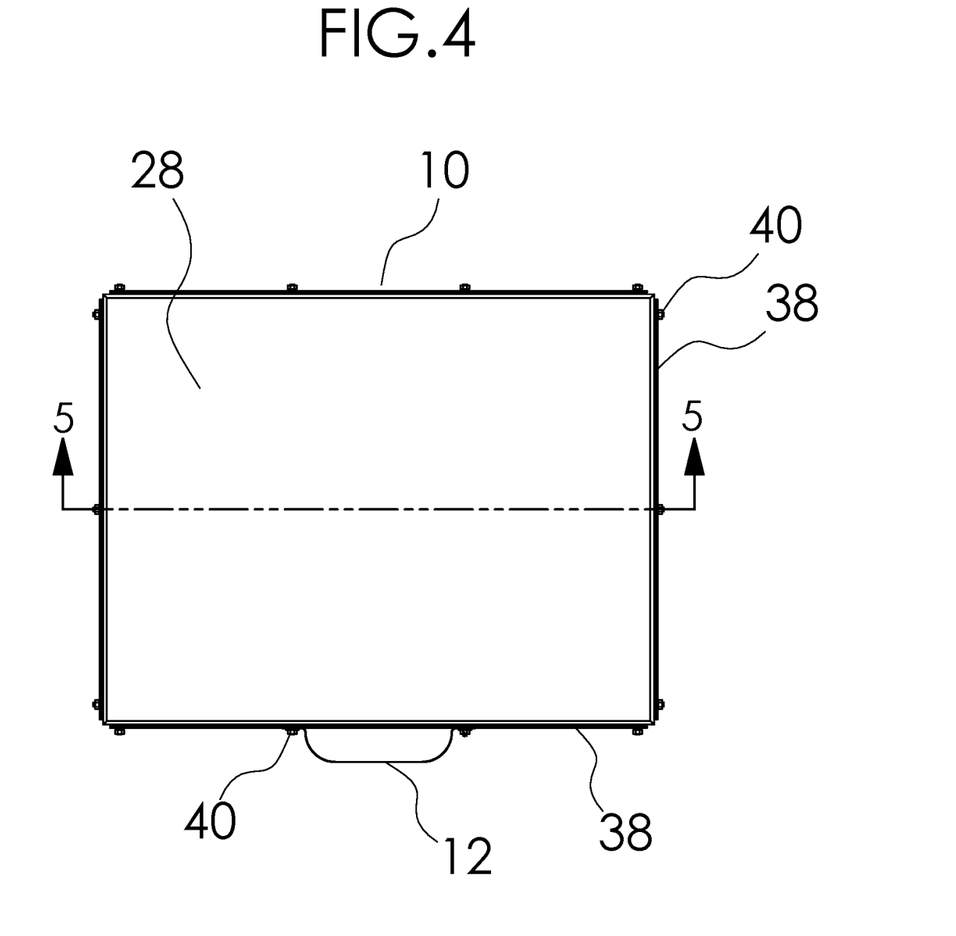
FIG. 4 is a top view of the pet bed shown in FIG. 1.

Retainer bars 38 are preferably thin with planar sides and extend along the length of the side surfaces 20, 22, 24, 26 (see FIGS. 3 and 4). Apertures are formed in the retainer bars 38 wherever a dowel 34 is going to project from the foam core 14. The retainer bars 38 provide stability to the pet bed 10 since they are typically made of a rigid material such as metal. They also provide a surface against which the fastener nuts 40 abut to prevent damage to the foam core 14 and the artificial turf 28.

As seen in FIG. 6, the flap 30 of the artificial turf 28 is adjacent the side surface 20, the retainer bar 38 is outward of the flap 30 of the artificial turf 28, and the fastener nut 40 is threaded onto the end region 36 of the dowel 34. As the fastener nut 40 is tightened by turning it relative to the dowel 34, the retainer bar 38 is urged inward toward the side surface 26 which also causes the flap 30 of the artificial turf 28 to be urged against the side surface 26, When the fastener nut 40 is turn sufficiently, the flap 30 of the artificial turf 28 may be in contact with the side surface 26 and sandwiched against the side surface by the retainer bar 38 which is held in place by the fastener nut 40. Thus, the artificial turf 28 is secured to the foam core 14. By repeating this turning action for every fastener nut 40 around the periphery of the foam core 14, all of the flaps 30 of the artificial turf 28 are secured to the side surfaces 20, 22, 24, 26 of the foam core 14.

By sandwiching the artificial turf 28 between the retainer bar 38 and the side surface 26 of the foam core 14, it is not required that there be contact between the retainer bar 38 and the artificial turf 28 and/or between the artificial turf 28 and the foam core 14. Other layers or substrates may be interposed between this structure while maintaining the pressing effect arising from the fastener nuts 40 moving in a direction toward the foam core 14.

For example, in the illustrated embodiment wherein the foam core 14 is rectangular and there are thus four flaps 30 of the artificial turf 28, one on each of the four sides of the foam core 14, each flap 30 is secured to a respective side surface 20, 22, 24, 26 of the foam core 14. Once the fastener nuts 40 are tightened, the artificial turf 28 is thus pulled from all four sides to make it very tight against the upper surface 16 of the foam core 14.

Use of the threaded dowels 34, retainer bars 38 and cooperating fastener nuts 40 provides a permanent means for securing the artificial turf 28 to the foam core 14 with dynamic tension. It is believed that this selection of components to provide for easy and secure attachment of the artificial turf 28 over the upper surface 16 of the foam core 14, with its flaps 30 secured to the sides of the foam core 14 is not disclosed in the prior art mentioned above, nor an obvious variant thereof.

This cooperation of elements is of paramount importance when endeavoring to make a suitable platform or bed for pets because artificial turf is generally impervious to known adhesives acting without dynamic tension, and anchors embedded in a foam core, or other structure such as described in West mentioned above, will not remain secure, allowing the artificial turf and foam core to separate in relatively short period of time. Use of fastener nuts 40 threaded onto the threaded end regions 36 of the dowels 34 that extend through the foam core 14, enables tightening of these fastener nuts 40 if they ever become loose. A periodic examination of the tension of the artificial turf 28 to the foam core 14 can be undertaken and if the artificial turf 28 is found to be sagging or loose, by tightening the fastener nuts 40, this sagging or looseness can be eliminated, thereby maintaining the artificial turf 28 against the foam core 14.

Handle 12 is secured to the foam core 14 using two fastener nuts 40 alongside one another on a long side surface 20 of the foam core 14. Handle 12 is dimensioned and provided with two apertures along flanges that can align with two adjacent dowels 34. The fastener nuts 40 for these dowels 34 are not only threaded through a respective aperture in the flap 30 of the artificial turf 28 and an aligning aperture in the retainer bar 38, but are also threaded through an aligning aperture in the flange of the handle 12, and only thereafter tightened. Optionally, a grommet may be used to aid in the attachment of the handle 12 to the dowel 34.

With this construction, the handle 12 is also secured to the dowels 34 forming an integral or integrated structure. Incorporating such an integral handle in a pet bed is also an important aspect of the invention. The handle 12 is highly unlikely to separate from the foam core 14 and thus maintain the integrity of the pet bed 10 with an easy to use handling device.

Although the dowels 34 cooperating with the fastener nuts 40 and sandwiching the retainer bars 38 and the artificial turf 28 therebetween is a preferred embodiment to secure the artificial turf 28 to the foam core 14, other securing mechanisms may be used.

Accordingly, the common feature of these securing mechanisms is an elongate connector extending through the foam core 14 between the upper and lower surfaces 16, 18 of the foam core 14 and having opposite end regions projecting out of opposite sides of the foam core 14. These opposite end regions are secured outside of the foam core 14 on the other side of the foam core 14 from the flaps 30 of the artificial turf 28. This means that the opposite end regions are prevented from being drawn through apertures in the flaps 30 of the artificial turf 28 against the foam core 14 and possibly into channels of the connectors through the foam core 14. The structure which prevents the opposite end regions from being drawn through the apertures of the flaps 30 of the artificial turf 28 may be part of the connectors themselves or separate structure that engages or cooperates with the connectors to perform this functionality.

For example, the securing mechanisms may be flexible wire, straps, or bands (including steel cable, plastic cable ties, leather or synthetic or natural strand, twine, or rope) which transect the foam core 14 and are secured to fender washers or similar discrete points at the ends of transecting materials. Without the semi-rigid dowels 34, such embodiments would provide for a lighter, more flexible pet bed.

Figure 7:
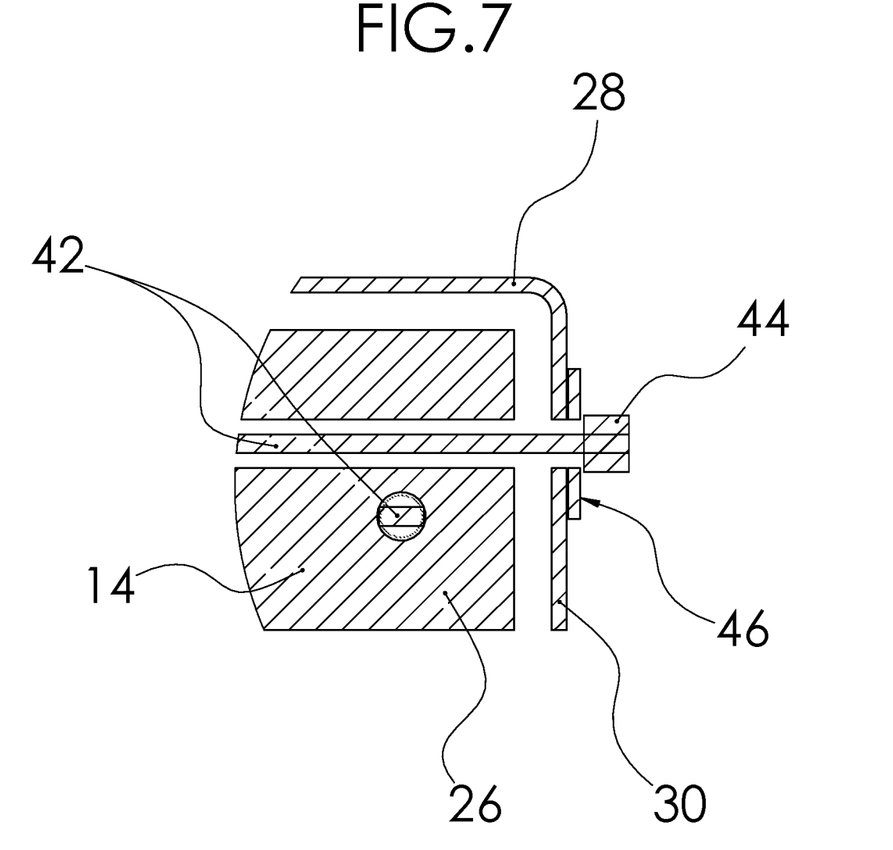
FIG. 7 is an alternative view of the section 6 in FIG. 5.

One such embodiment is represented by FIG. 7 which is a substitute drawing for FIG. 6. This embodiment of the pet bed includes all of the features of the pet bed 10 with the exception of the dowels 34, retainer bars 38 and fastener nuts 40 which are not included in this embodiment. There is thus a different securing mechanism to secure the flaps 30 of the artificial turf 28 to the foam core 14.

In this embodiment, the connectors are cables 42 terminated by cable ties 44 at their opposite end regions and the cable ties 44 cannot pass through the apertures of the flaps 30 of the artificial turf 28 and against or into the foam core 14 and therefore secure the artificial turf 28 to the foam core 14. A washer 46 is preferably provided inward of the cable ties 44 to improve the resistant to passage of the cable ties 44 through the apertures in the flaps 30 of the artificial turf 28. Washers 46 may be considered a substitute for the retainer bars 38 and may be used interchangeably with the retainer bars 38, e.g., retainer bars 38 may be used in this embodiment and washers may be used in the embodiment of FIGS. 1-6.

In another embodiment, the connectors may each be a length of flexible wire that is tied, and the tied portion of the wires cannot pass through the apertures of the flaps 30 of the artificial turf 28 and into the foam core 14 and therefore secure the artificial turf 28 to the foam core 14. This tied portion of each wire is considered structure that prevents the artificial turf 28 from separating from the foam block 14. In this case, it is not a separate component, such as the fastener nuts 40 or the cable ties 44, but rather the securing structure is integral with or integrated into the connector. Only an elongate length of flexible wire is required for each connector.

To improve adherence of the artificial turf 28 to the foam core 14, adhesive is advantageously applied to the side surfaces 20, 22, 24, 26 of the foam core 14 and/or to the flaps 30 of the artificial turf 28 that will be pressed against these side surfaces 20, 22, 24, 26. As such, when the flaps 30 of the artificial turf 28 are brought into contact with the side surfaces 20, 22, 24, 26 as the fastener nuts 40 are tightened on the threaded end regions 36 of the dowels 34, the adhesive improves the retention of the flaps 30 of the artificial turf 28 to the side surfaces 20, 22, 24, 26, due at least in part to the dynamic tension afforded by the dowels 34/fastener nuts 40.

Modifications of the pet bed 10 are envisioned and considered part of the invention. For example, a commercially available insulated pad or blanket can be provided with flaps having apertures to enable the pad or blanket to be secured to the foam core 14 in the same manner that the artificial turf 28 is secured to the foam core 14. The pad or blanket may be secured in addition to the artificial turf 28 if so desired, either above or below the artificial turf 28. A pet using the pet bed 10 would therefore be warm in winter and cold environments.

Pet bed 10 in any of the constructions described above provides a comfortable spot for a pet to dry off when wet, as it keeps water away from the pet. The pet bed 10 is also portable for use when traveling, camping or boating. Pet bed 10 generally provides a comfortable location for a pet on wet, rough, stony, muddy and hard surfaces.

Description of the pet bed 10 above does not preclude novelty in the manner in which the pet bed 10 is manufactured. A method for making the pet bed 10, or more generally a platform, is considered to be part of the invention and entails covering the upper surface 16 and a periphery of the foam core 14 with the artificial turf 28, and passing each of a plurality of elongate connecters (whether dowels 34 or other connectors described above, e.g., cables) from one side surface of the foam core 14 through the foam core 14 between the upper surface 16 and opposed lower surface 18 of the foam core 14 to an opposite side surface of the foam core 14 while leaving an end region at each end of the connector exposed. Then, the exposed end regions of the connectors are passed through apertures in the artificial turf 28, more specifically through apertures in flaps 30 of the artificial turf 28 that are adjacent to the side surfaces 20, 22, 24, 26 of the foam core 14 having been draped over these side surfaces 20, 22, 24, 26. Finally, fasteners are secured or formed in or by the exposed end regions of the connectors to secure the artificial turf 28 to the side surfaces 20, 22, 24, 26 of the foam core 14. The foam core 14 can be formed with the connectors passing therethrough or with channels and the connectors passed therethrough.

Finally, although pet bed 10 is described for particular use by a pet, this does not preclude use of the pet bed in any of the above-disclosed embodiments for other uses, e.g., wherever a platform with an upper, exposed surface formed by artificial turf is desired.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. Among other modifications, features of the U.S. and foreign patent documents mentioned above, all of which are incorporated by reference herein, can be used in the pet bed 10 in accordance with the invention to the extent possible, and all such modifications are considered by the inventor to be part of the invention.

The invention claimed is:

1. A platform, comprising:
   a foam core having an upper surface, a lower surface on an opposite side of said foam core from said upper surfaces, and at least one side surface between said upper and lower surfaces along a periphery of said foam core;
   artificial turf extending over said upper surface and alongside said at least one side surface; and
   elongate connectors extending longitudinally through said foam core between said upper and lower surfaces, each of said connectors having opposite end regions at longitudinally opposite ends of said connector and projecting out of said foam core and beyond said at least one side surface on opposite sides of said foam core,
   said connectors securing said artificial turf to said foam core.

2. The platform of claim 1, wherein said connectors include at least two connectors perpendicular to each other.

3. The platform of claim 1, wherein said foam core is rectangular such that said at least one side surface of said foam core comprises a first pair of opposed side surfaces and a second pair of opposed side surfaces, said connectors comprising a first connector having opposite end regions projecting out of said first pair of opposed side surfaces and a second connector having opposite end regions projecting out of said second pair of opposed side surfaces.

4. The platform of claim 3, wherein said first connector is perpendicular to said second connector or crosses over said second connector at a location in an interior of said foam core.

5. The platform of claim 3, wherein said first pair of opposed side surfaces are longer than said second pair of opposed side surfaces, said connectors further comprising a third connector having opposite end regions projecting out of said first pair of opposed side surfaces parallel to and spaced apart from said first connector.

6. The platform of claim 5, wherein said connectors further comprise a fourth connector having opposite end regions projecting out of said second pair of opposed side surfaces parallel to and spaced apart from said second connector.

7. The platform of claim 6, wherein said connectors further comprise:
   a fifth connector having opposite end regions projecting out of said first pair of opposed side surfaces parallel to and spaced apart from said first and third connectors, said first, third and fifth connectors being spaced equally apart from one another; and
   a sixth connector having opposite end regions projecting out of said second pair of opposed side surfaces parallel to and spaced apart from said second and fourth connectors, said second, fourth and sixth connectors being spaced equally apart from one another.

8. The platform of claim 1, further comprising at least one retainer bar each alongside a respective one of said at least one side surface, said opposite end regions of said connectors passing through apertures in said artificial turf and said at least one retainer bar to sandwich said artificial turf between said at least one retainer bar and said foam core.

9. The platform of claim 8, wherein each of said connectors comprises an elongate rod such that said opposite end regions of said connectors are defined by opposite end regions of said rods, and two fasteners that each engage with a respective one of said opposite end regions of said rod to fasten said at least one retainer bar against said foam core with said artificial turf therebetween.

10. The platform of claim 1, wherein said connectors are semi-rigid.

11. The platform of claim 1, wherein each of said connectors comprises:
an elongate dowel such that said opposite end regions of said connector are defined by opposite end regions of said dowel, wherein said opposite end regions of said dowel are threaded and at least partly project through a respective aperture in said artificial turf; and
two fastener nuts that each screw onto a respective one of said threaded end regions of said dowel to thereby secure said artificial turf to said foam core.

12. The platform of claim 11, further comprising at least one retainer bar each alongside a respective one of said at least one side surface, said opposite end regions of said dowels extending through apertures in said at least one retainer bar that align with apertures in said artificial turf and then engaging with said fastener nuts to secure said artificial turf between said at least one retainer bar and said foam core.

13. The platform of claim 1, further comprising a handle attached to two of said connectors.

14. The platform of claim 1, wherein said upper surface of said foam core is planar.

15. The platform of claim 1, wherein said foam core is rectangular having four straight sides and said connectors include at least one connector alongside each of said sides of said foam core.

16. The platform of claim 1, wherein said artificial turf does not extend over said lower surface of said foam core.

17. A platform, comprising:
a foam core having a planar upper surface, a lower surface on an opposite side of said foam core from said upper surface, and at least one side surface between said upper and lower surfaces along a periphery of said foam core;
artificial turf extending over said upper surface and alongside said at least one side surface; and
elongate connectors each extending through said foam core between said upper and lower surfaces and securing said artificial turf to said foam core,
said connectors comprising a first plurality of connectors having opposite end regions projecting at each of said opposite end regions out of a first pair of opposite side surfaces of said foam core, and a second plurality of connectors having opposite end regions projecting at each of said opposite end regions out of a second pair of opposite side surfaces of said foam core, said connectors of said second plurality of connectors being perpendicular to said connectors of said first plurality of connectors.

18. The platform of claim 17, further comprising at least one retainer bar each alongside a respective one of said at least one side surface, said opposite end regions of said connectors passing through aligning apertures in said artificial turf and said at least one retainer bar to sandwich said artificial turf between said at least one retainer bar and said foam core.

19. The platform of claim 17, wherein each of said connectors comprises an elongate rod such that said opposite end regions of said connector are defined by opposite end regions of said rod, and two fasteners that each engage with a respective one of said opposite end regions of said rods to fasten said at least one retainer bar against said foam core with said artificial turf therebetween.

20. A method for making a platform, comprising:
covering an upper surface and a periphery of a foam core with artificial turf;
passing each of a plurality of elongate rods from one side surface of the foam core through the foam core between the upper surface and an opposed lower surface of the foam core to an opposite side surface of the foam core while leaving an end region at each end of the rod exposed;
positioning the exposed end regions of the rods through apertures in the artificial turf; and then
securing fasteners to the exposed end regions of the rods to secure the artificial turf to the side surfaces of the foam core.

21. A platform, comprising:
a foam core having an upper surface, a lower surface on an opposite side of said foam core from said upper surface, and at least one side surface between said upper and lower surfaces along a periphery of said foam core;
artificial turf extending over said upper surface and alongside said at least one side surface; and
elongate connectors extending through said foam core between said upper and lower surfaces and having opposite end regions projecting out of opposite sides of said foam core,
said connectors securing said artificial turf to said foam core,
said connectors including at least two connectors perpendicular to each other or that cross over one another at a location in an interior of said foam core.

22. A platform, comprising:
a foam core having an upper surface, a lower surface on an opposite side of said foam core from said upper surface, and at least one side surface between said upper and lower surfaces along a periphery of said foam core;
artificial turf extending over said upper surface and alongside said at least one side surface;
elongate connectors extending through said foam core between said upper and lower surfaces and having opposite end regions projecting out of opposite sides of said foam core, said connectors securing said artificial turf to said foam core; and
at least one retainer bar each alongside a respective one of said at least one side surface or a plurality of washers each aligned with apertures in said artificial turf,
each of said opposite end regions of said connectors passing through a respective aperture in said artificial turf and an aligning respective aperture in said at least one retainer bar or in one of said plurality of washers to sandwich said artificial turf between said at least one retainer bar or said plurality of washers and said foam core.

23. A platform, comprising:
a foam core having an upper surface, a lower surface on an opposite side of said foam core from said upper surface, and at least one side surface between said upper and lower surfaces along a periphery of said foam core;

artificial turf extending over said upper surface and alongside said at least one side surface;

elongate connectors extending through said foam core between said upper and lower surfaces and having opposite end regions projecting out of opposite sides of said foam core, said connectors securing said artificial turf to said foam core; and a handle attached to two of said connectors.

\* \* \* \* \*